United States Patent

Kim

[11] Patent Number: 5,771,079
[45] Date of Patent: Jun. 23, 1998

[54] APPARATUS AND METHOD FOR PREDICTING PIXEL DATA OF DYNAMIC IMAGE USING A HALF PIXEL PITCH

[75] Inventor: Jin-Gyeong Kim, Seoul, Rep. of Korea

[73] Assignee: LG Electronics Inc., Seoul, Rep. of Korea

[21] Appl. No.: 702,098

[22] Filed: Aug. 23, 1996

[30] Foreign Application Priority Data

Aug. 25, 1995 [KR] Rep. of Korea ................. 1995/26656

[51] Int. Cl.[6] .............................. H04N 7/28; H04N 7/50
[52] U.S. Cl. .......................... 348/699; 348/402; 348/416
[58] Field of Search .................................. 348/416, 413, 348/699, 402, 407

[56] References Cited

U.S. PATENT DOCUMENTS

| | | | |
|---|---|---|---|
| 4,937,666 | 6/1990 | Yang | 358/136 |
| 5,408,269 | 4/1995 | Tsukagoshi | 348/416 |
| 5,510,842 | 4/1996 | Phillips et al. | 348/416 |
| 5,541,661 | 7/1996 | Odaka et al. | 348/416 |
| 5,587,741 | 12/1996 | Kim | 348/416 |

*Primary Examiner*—Tommy P. Chin
*Assistant Examiner*—Luanne P. Din
*Attorney, Agent, or Firm*—Morgan, Lewis & Bockius LLP

[57] ABSTRACT

An apparatus and method for predicting a plurality of pixel data using a half pixel pitch wherein the method includes the steps of arranging a plurality of reference pixel data in parallel, the plurality of reference pixel data being compressed with one motion vector; rearranging the plurality of the reference pixel data in parallel, the plurality of reference pixel data input according to the motion vector; and processing the plurality of rearranged reference pixel data according to the motion vector to produce a plurality of pixel data in parallel predicted using the half pixel pitch.

5 Claims, 4 Drawing Sheets

APPARATUS AND METHOD FOR PREDICTING PIXEL DATA OF DYNAMIC IMAGE USING A HALF PIXEL PITCH

BACKGROUND OF THE INVENTION

1. Field of the Invention

The present invention relates to a decoder having motion compensation, and more particularly, to an apparatus and a method for predicting motion compensation of a dynamic image using a half pixel pitch.

2. Discussion of the Related Art

Motion compensation in a decoder is carried out to decompress a signal whose amplitude is reduced to a predetermined value as one-picture compression by motion predicting techniques. An apparatus for predicting motion compensation of a dynamic image using a half pixel pitch forms predicted pixel data using a half pixel pitch by processing reference pixel data when the decoder executes motion compensation of a dynamic image using a half pixel pitch.

Picture compression techniques using intra-frame motion compensation have advantages in compression by replacing pixel data of a predicted picture's predetermined field (16× 16 pixels) with position data of one field in a reference picture that is the most identical with the predetermined field and a difference between each pixel data of the two fields, as shown in FIG. 1. In order to maximize the compression effect, the position data is detected using a half pixel pitch in the reference picture. Data values among pixels are gained through filtering.

Motion vectors, as shown in FIG. 2, are indicative of a difference in position between the pixel data of the reference picture used to restore pixel data of the predicted picture and the pixel data of the predicted picture. Such motion vectors are displayed using a half pixel pitch.

FIG. 3 depicts the positions of the reference pixel data when each motion vector of the X and Y axes is given using a half pixel pitch. Accordingly, when the positions of the pixel data that are to be restored in the predicted picture is A and each motion vector is smaller than 1, the positions of the reference pixel data may be A, a, b and c as shown in FIG. 3. Namely, A, a, b and c have the following motion vectors: A (0,0); a (0.5, 0); b (0, 0.5); and c (0.5, 0.5). When each motion vector is larger than 1, a pixel-pitch prediction of pixel data can be executed as the data is read out of the reference picture by offsetting the data address. When the half-pixel pitch prediction of the pixel data is required, this can be executed by filtering neighboring pixel data.

Conventional filtering techniques employ a simple averaging method. A device used for a conventional half-pixel pitch predicting system is illustrated in FIG. 4.

Referring to FIG. 4, the device for a conventional half-pixel pitch predicting system includes a first filtering unit 30 that gains horizontal pixel data predicted using a half pixel pitch, and a second filtering unit 50 that gains vertical pixel data predicted using a half pixel pitch.

The first filtering unit 30 serially receives 8-bit reference pixel data compressed with one motion vector and averages the reference pixel data according to the half pixel data of the horizontal motion vector of the above motion vector. As a result of the filtering, horizontal pixel data predicted using a half pixel pitch is achieved.

The 8-bit horizontal pixel data produced by the first filtering unit 30 is serially input to the second filtering unit 50. The second filtering unit 50 executes filtering by averaging horizontal pixel data which is input thereto according to the half pixel data of the vertical motion vector of the above motion vector. As a result of the filtering, vertical pixel data predicted using a half pixel pitch is obtained.

According to the above-mentioned conventional technique, predetermined-bit reference pixel data are serially input to each filtering unit 30 and 50 and filtered pixel data are produced serially, thereby lowering the decoding rate.

SUMMARY OF THE INVENTION

Accordingly, the present invention is directed to an apparatus and a method for predicting motion compensation of a dynamic image by half pixel pitch, which substantially obviate one or more of the problems due to limitations and disadvantages of the related art.

An object of the present invention is to provide an apparatus and a method for predicting motion compensation of a dynamic image using a half pixel pitch, thereby enhancing the decoding rate.

Additional features and advantages of the invention will be set forth in the description which follows, and in part will be apparent from the description, or may be learned by practice of the invention. The objective and other advantages of the invention will be realized and attained by the structure and method particularly pointed out in the written description and claims hereof as well as the appended drawings.

To achieve these and other advantages and in accordance with the purpose of the present invention, as embodied and broadly described, the method for predicting a plurality of pixel data using a half pixel pitch includes the steps of arranging a plurality of reference pixel data in parallel, the plurality of reference pixel data being compressed with one motion vector; rearranging the plurality of the reference pixel data in parallel, the plurality of reference pixel data input according to the motion vector; and processing the plurality of rearranged reference pixel data according to the motion vector to produce a plurality of pixel data in parallel predicted using the half pixel pitch.

In another aspect, the apparatus for predicting a plurality of reference pixel data using a half pixel pitch includes a data arranging unit for receiving a plurality of pixel data compressed with one motion vector and for rearranging a plurality of the pixel data in parallel according to the motion vector; and a filtering unit for filtering a plurality of the pixel data rearranged in parallel by the data arranging unit and neighboring pixel data using the motion vector and for producing a plurality of pixel data in parallel predicted using the half pixel pitch.

In another aspect, the apparatus for predicting pixel using a half pixel pitch includes a data arranging unit for receiving a plurality of pixel data in parallel compressed with one motion vector and for rearranging a plurality of the pixel data in parallel according to the motion vector; a first filtering unit for simultaneously producing, in parallel, a plurality of horizontal pixel data predicted using the half pixel pitch by adding each pixel data rearranged in parallel with pixel data adjacent in one direction; and a second filtering unit for simultaneously producing, in parallel, a plurality of vertical pixel data predicted using the half pixel pitch by adding each horizontal pixel data produced by the first filtering unit with the pixel data each delayed by one line from the horizontal pixel data.

To further achieve these and other advantages and in accordance with the purpose of the present invention, as embodied and broadly described, the inventive method for predicting a plurality of pixel data by half pixel pitch including the steps of: (a) arranging in parallel a plurality of reference pixel data compressed with one motion vector; (b) rearranging in parallel a plurality of the reference pixel data input according to the motion vector; and (c) processing a plurality of the rearranged reference pixel data on the basis of the motion vector and producing in parallel a plurality of pixel data predicted by half pixel pitch.

The inventive apparatus for predicting a plurality of reference pixel data by half pixel pitch includes a data arranging unit for receiving a plurality of pixel data compressed with one motion vector and for rearranging in parallel a plurality of the pixel data according to the motion vector; and a filtering unit for filtering a plurality of the pixel data rearranged in parallel by the data arranging unit and neighboring pixel data by using the motion vector and for producing in parallel a plurality of pixel data predicted by half pixel pitch.

Another aspect of the present invention, an apparatus for predicting pixel data by half pixel pitch, includes a data arranging unit for receiving in parallel a plurality of pixel data compressed with one motion vector, and for rearranging in parallel a plurality of the pixel data according to the motion vector; a first filtering unit for producing simultaneously in parallel a plurality of horizontal pixel data predicted by half pixel pitch by adding up each pixel data rearranged in parallel and pixel data adjacent to each pixel data in one direction; and a second filtering unit for producing simultaneously in parallel a plurality of vertical pixel data predicted by half pixel pitch by adding up each horizontal pixel data produced by the first filtering unit and pixel data each delayed by one line from the horizontal pixel data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
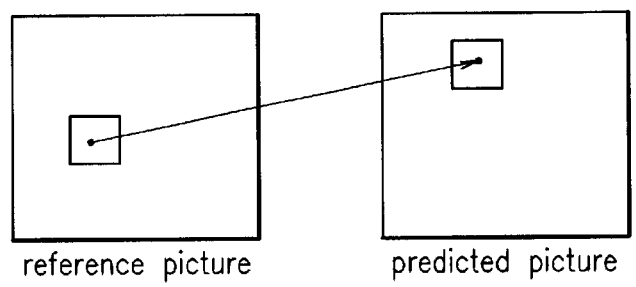
FIG. 1 is a diagram depicting a conventional intra-frame motion compensation.
Figure 2:
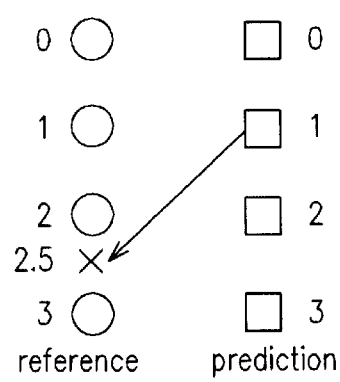
FIG. 2 is a diagram illustrating a conventional motion vector.
Figure 3:
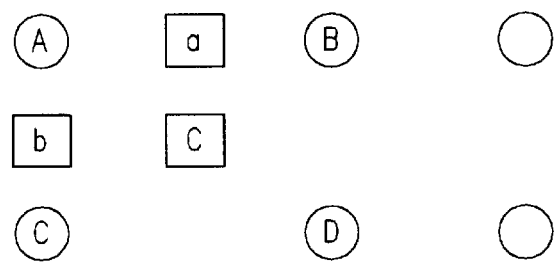
FIG. 3 is a diagram depicting a filtering technique for half-pixel pitch prediction of pixel data.
Figure 4:
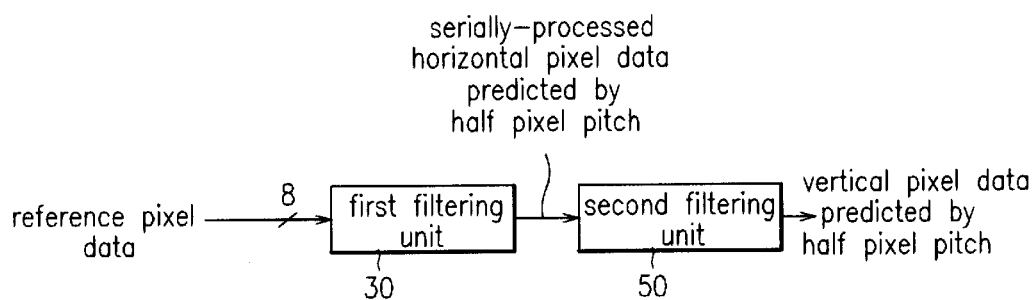
FIG. 4 is a block diagram of filtering units for a conventional half-pixel pitch prediction of pixel data.
Figure 5:
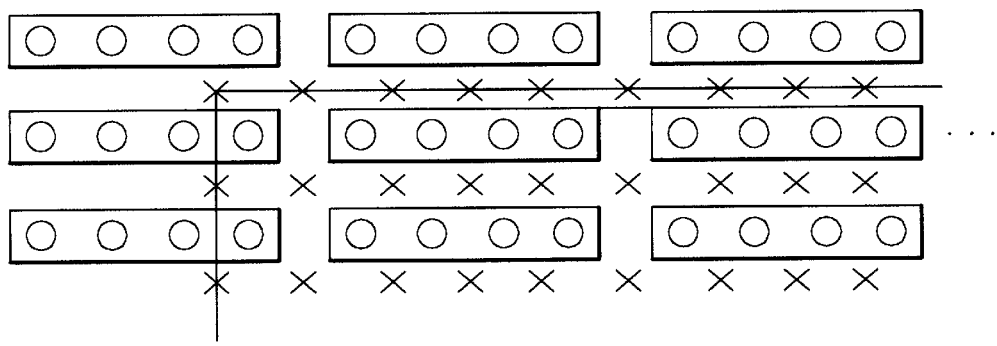
FIG. 5 is a diagram depicting a diagram of four pixel data by parallel processing in accordance with the present invention.
Figure 6:
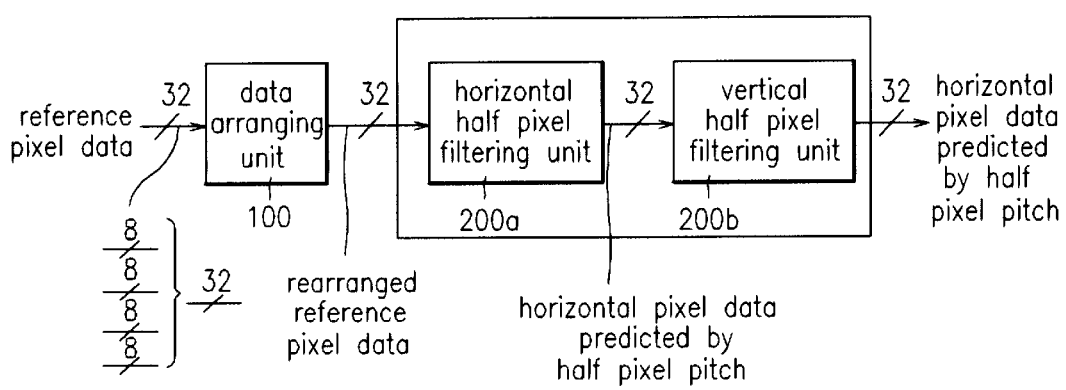
FIG. 6 is a block diagram showing an exemplary embodiment of a filtering circuit in accordance with the present invention.

FIG. 5 shows a diagram of four pixel data inputs to be parallel processed, and FIG. 6 is a block diagram showing an exemplary embodiment of a filtering circuit in accordance with the present invention in the case of parallel processing of four pixel data.

Referring to FIG. 6, according to the present invention, the apparatus includes a data arranging unit 100 that rearranges each position of the four pixel data using one motion vector when the four pixel data, compressed with the motion vector, are simultaneously input thereto, and a filtering unit 200 that filters the four pixel data rearranged by the data arranging unit 100 and simultaneously produced in parallel along with neighboring pixel data using the one motion vector to produce, in parallel, the four horizontal pixel data and the four vertical pixel data predicted using a half pixel pitch.

The filtering unit 200 of FIG. 6 includes a first filter 200a that produces simultaneously, in parallel, the four horizontal pixel data predicted using a half pixel pitch, and a second filter 200b that produces simultaneously, in parallel, the four vertical pixel data predicted using a half pixel pitch. Herein, each pixel data is 8-bit data in the preferred embodiment. Moreover, a motion vector using a half pixel pitch is displayed which consists of a vertical motion vector and a horizontal motion vector.

The data arranging unit 100 rearranges each position of the four pixel data by the horizontal portion of the motion vector, particularly. The first filter 200a produces simultaneously, in parallel, the four horizontal pixel data predicted using a half pixel pitch by adding up each one of the four pixel data rearranged and produced by the data arranging unit 100 and one pixel data adjacent to each one of the four pixel data in one direction. The second filtering unit 200b adds up each one of the four pixel data produced in parallel by the first filtering unit 200a and one pixel data delayed by one line therefrom so that the four vertical pixel data predicted using a half pixel pitch is produced simultaneously, in parallel.

Figure 7:
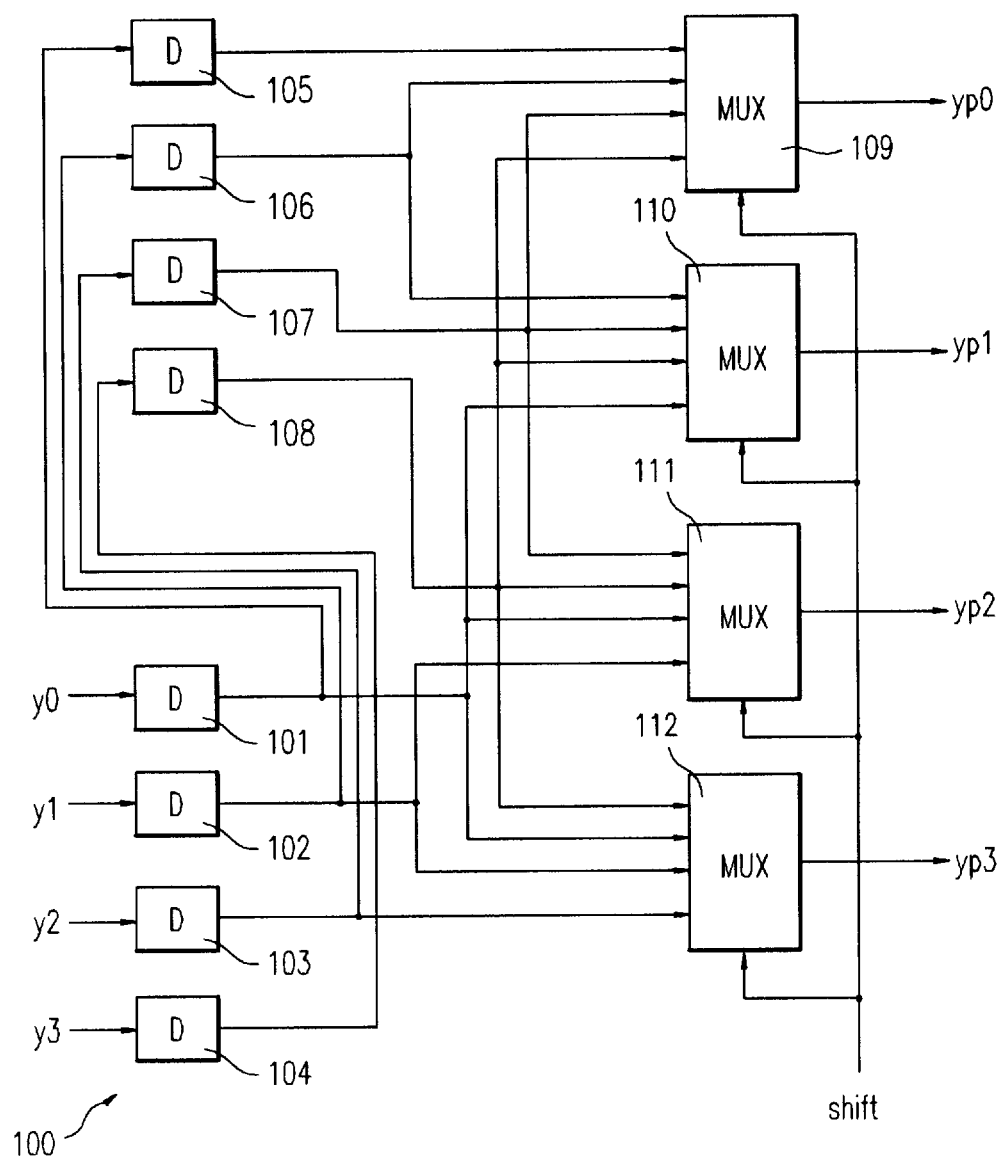
FIG. 7 is detailed circuit diagram of the data arranging unit of FIG. 6.

Referring to FIG. 7, the data arranging unit 100 includes first to fourth delayers 101, 102, 103 and 104 to delay each one of the four pixel data by one pixel, fifth to eighth delayers 105, 106, 107 and 108 to delay by an additional pixel for each of the pixel data delayed by the first to fourth delayers 101 to 104 so that each of the four pixel data are resultantly delayed by two pixels, and first to fourth multiplexers 109, 110, 111 and 112 which selectively produce each one of yp0, yp1, yp2 and yp3 output by the first to eighth delayers 101 to 108 in response to a given shift signal. In the case that the unit of a motion vector is a half pixel, the shift signal (shift) applied to each one of the first to fourth multiplexers 109 to 112 is a value obtained by dividing again by 2 the remainder of dividing the horizontal motion vector by 8.

Figure 8:
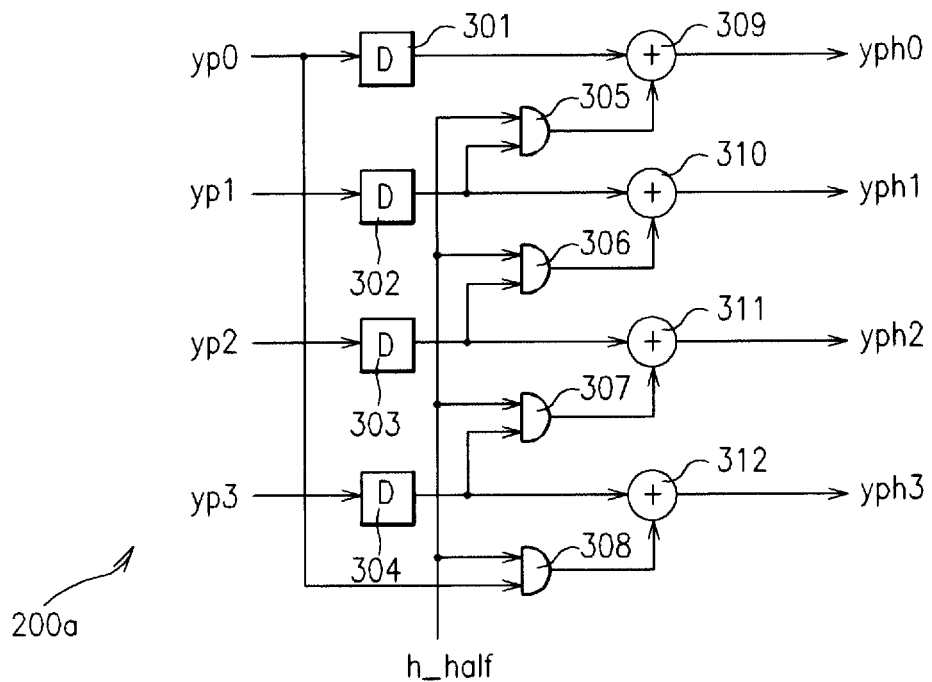
FIG. 8 is a detailed circuit diagram of the first filtering unit of FIG. 6.

Referring to FIG. 8, the first filtering unit 200a of FIG. 6 includes ninth to twelfth delayers 301, 302, 303 and 304 which delay by one pixel each of the four pixel data yp0, yp1, yp2 and yp3 produced by the data arranging unit 100, first to fourth AND gates 305, 306, 307 and 308 which perform an AND operation with respect to a horizontal pixel signal h_half and each of the four pixel data delayed by one pixel, and first to fourth adders 309, 310, 311 and 312 which generate outputs yph0, yph1, yph2 and yph3 by adding each output of the ninth to twelfth delayers 301 to 304 to each output of the first to fourth AND gates 305 to 308. In the preferred embodiment, a value of the horizontal half pixel signal h_half is the remainder of dividing the horizontal motion vector by two, which value determines whether each adder 309 to 312 performs an addition or not.

Figure 9:
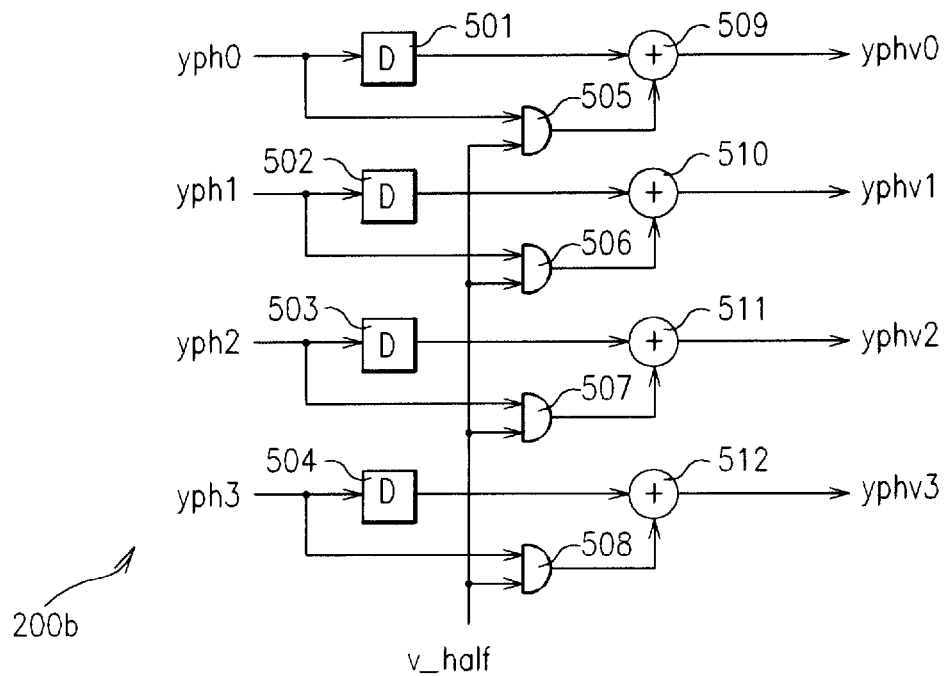
FIG. 9 is a detailed circuit diagram of the second filtering unit of FIG. 6.

Referring to FIG. 9, the second filtering unit 200b includes first to fourth line delayers 501, 502, 503 and 504 which delay each one of the four pixel data outputs yph0, yph1, yph2 and yph3 by one line, fifth to eighth AND gates 505, 506, 507 and 508 which perform an AND operation with respect to a vertical pixel signal v_half and each of the four pixel data delayed by one line, and fifth to eighth adders 509, 510, 511 and 512 which add each output of the first to fourth line delayers 501 to 504 to each output of the fifth to eighth AND gates 505 to 508. In the preferred embodiment, a value of the vertical half pixel signal v_half is the remainder of dividing the vertical motion vector by two, which value determines whether each of the fifth to eighth adders 509 to 512 performs an addition or not.

Since a motion vector is generated using a half pixel pitch in the case of parallel-processing the four pixel data, pixel data indicated by X (FIG. 5) are produced in sets of four from the inventive apparatus for half-pixel pitch prediction of pixel data. Therefore, a conventional apparatus for one-pixel pitch prediction of pixel data should have an additional function of changing the arrangement of the produced pixel data. As discussed above, the prediction of the four pixel data by horizontal half pixel pitch is performed by parallel processing, and the prediction of the four pixel data by vertical half pixel pitch is also performed by parallel processing.

As shown in FIG. 7, when the 8-bit pixel data y0, y1, y2 and y3 are input to the data arranging unit 100, they are respectively delayed by one pixel by the first to fourth delayers 101 to 104, and then delayed by one pixel by the fifth to eighth delayers 105 to 108. Each of the first to fourth multiplexers 109 to 112 selects one of the outputs from the first to eighth delayers 101 to 108 in response to the shift signal (shift) so that the initially-input four pixel data yp0 to yp3 whose positions are rearranged are produced. In other words, the positions of the four pixels are changed by motion vectors, and in the case that a motion vector is displayed using a half pixel pitch, the shift signal applied to the first to fourth multiplexers 109 to 112 has a value obtained by dividing by 2 the remainder of dividing the horizontal motion vector by 8. Each of the first to fourth multiplexers 109 to 112 selects and produces one of the four pixel data in response to the shift signal. Thus, the four reference pixel data that are input by the motion vectors are rearranged and then produced by the data arranging unit 100.

Each of the ninth to twelfth delayers 301 to 304 of the first filtering unit 200a delays by one pixel each pixel data arranged by the data arranging unit 100. The first to fourth AND gates 305 to 308 determine whether each adder 309 to 312 performs an addition or not in response to the given horizontal half pixel signal h_half. A value of the horizontal half pixel signal is the remainder of dividing the horizontal motion vector by 2. If the horizontal motion vector has half pixel data, the horizontal half pixel signal h_half attains a high level. Otherwise, the signal h_half attains a low level. Therefore, if the horizontal motion vector does not have half pixel data, each output of the first to fourth AND gates 305 to 308 attains a low level, and the first to fourth adders 309 to 312 output the four pixel data intact as produced by the first to fourth adders 301 to 304. In the meantime, if the horizontal motion vector has half pixel data, the first filtering unit 200a performs half-pixel pitch prediction of pixel data through filtering the present pixel data and the next pixel data whereby each output of the first to fourth AND gates 305 to 308 is varied with a value of each next pixel data.

The first AND gate 305 performs an AND operation with respect to the output of the tenth delayer 302 and the horizontal half pixel signal h_half, and inputs its result to the first adder 309 along with the output of the ninth delayer 301. The second AND gate 306 performs an AND operation with respect to the output of the eleventh delayer 303 and the horizontal half pixel signal h_half, and inputs its result to the second adder 310 along with the output of the tenth delayer 302. The third AND gate 307 performs an AND operation with respect to the output of the twelfth delayer 304 and the horizontal half pixel signal h_half, and inputs its result to the third adder 311 together with the output of the eleventh delayer 303. The fourth AND gate 308 performs an AND operation with respect to the output of the ninth delayer 301 that is one of the next four pixel data input in parallel and the horizontal half pixel signal h_half, and inputs its result to the fourth adder 312 together with the output of the twelfth delayer 304.

Therefore, the first adder 309 adds the outputs of the ninth and tenth delayers 301 and 302, the second adder 310 adds the outputs of the tenth and eleventh delayers 302 and 303, the third adder 311 adds the outputs of the eleventh and twelfth delayers 303 and 304, and the fourth adder 312 adds the output of the twelfth delayer 304 and the output of the ninth delayer 301 that is one of the next four pixel data input in parallel. Through filtering, the four horizontal pixel data yph0, yph1, yph2 and yph3 predicted using a half pixel pitch are produced in parallel.

The four horizontal pixel data produced in parallel by the first filtering unit 200a are delayed by one line by the first to fourth line delayers 501 to 504 of the first filtering unit 200b.

The fifth to eighth AND gates 505 to 508 determine if each of the fifth to eighth adders 509 to 512 performs an addition or not, in response to the vertical half pixel signal v_half. A value of the vertical half pixel signal v_half is the remainder of dividing the vertical motion vector by 2, and if the vertical motion vector has half pixel data, the vertical half pixel signal v_half attains a high level. Otherwise, the signal v_half attains a low level. Therefore, if the vertical motion vector does not have half pixel data, each output of the fifth to eighth AND gates 505 to 508 attains a low level, and the fifth to eighth adders 509 to 512 output the four horizontal pixel data intact that have been produced in parallel by the first to fourth delayers 501 to 504. In contrast, if the vertical motion vector has half pixel data, the fifth AND gate 505 performs an AND operation with respect to the first horizontal pixel data yph0 and the vertical half pixel signal v_half, and outputs to the fifth adder 509.

The sixth AND gate 506 performs an AND operation with respect to the second horizontal pixel data yph1 and the vertical half pixel signal v_half, and outputs to the sixth adder 510. The seventh AND gate 507 performs an AND operation with respect to the third horizontal pixel data yph2 and the vertical half pixel signal v_half, and outputs to the seventh adder 511. The eighth AND gate 508 performs an AND operation with respect to the fourth horizontal pixel data yph3 and the vertical half pixel signal v_half, and outputs to the eighth adder 512. The fifth adder 509 adds the first horizontal pixel data yph0 and the output of the first line delayer 501. The sixth adder 510 adds the second horizontal pixel data yph1 and the output of the second line delayer 502. The seventh adder 511 adds the third horizontal pixel data yph2 and the output of the third line delayer 503. The eighth adder 512 adds the fourth horizontal pixel data yph3 and the output of the fourth line delayer 504. Through filtering, the four vertical pixel data yphv0, yphv1, yphv2 and yphv3 predicted using a half pixel pitch are produced in parallel.

According to the apparatus and method of the present invention for predicting motion compensation of a dynamic image using a half pixel pitch, a plurality of pixel data are parallel-processed during the performance of the half-pixel pitch prediction of pixel data which is indispensable to the compression or decompression of a dynamic picture image, thereby offering an improved decoding rate.

It will be apparent to those skilled in the art that various modifications and variations can be made in the inventive apparatus and a method for predicting motion compensation of a dynamic image by half pixel pitch without departing from the spirit or scope of the invention. Thus, it is intended that the present invention cover the modifications and variations of this invention provided they come within the scope of the appended claims and their equivalents.

What is claimed is:

1. An apparatus for predicting pixel using a half pixel pitch, comprising:

a data arranging unit for receiving a plurality of pixel data in parallel compressed with one motion vector, and for rearranging the plurality of the pixel data in parallel according to the motion vector, the data arranging unit including:

a plurality of first delayers for delaying by one pixel the plurality of the pixel data input in parallel;

a plurality of second delayers for delaying by one pixel the plurality of pixel data delayed by the first delayers; and a plurality of multiplexers for rearranging a plurality of the pixel data by selectively producing outputs from the first and second delayers in response to a shift signal based on the motion vector;

a first filtering unit for simultaneously producing, in parallel, a plurality of horizontal pixel data predicted using the half pixel pitch by adding each pixel data rearranged in parallel with pixel data adjacent in one direction, the first filtering unit including:

a plurality of third delayers to delay by one pixel the plurality of data rearranged in parallel by the data arranging unit;

a plurality of first AND gates for performing an AND operation with respect to a horizontal half pixel signal based on the motion vector and pixel data produced by each delayer; and a plurality of first adders for producing a plurality of horizontal pixel data predicted by half pixel pitch by adding up each pixel data produced by each delayer and each output of the AND gates corresponding to the pixel data; and a second filtering unit for simultaneously producing, in parallel, a plurality of vertical pixel data predicted using the half pixel pitch by adding each horizontal pixel data produced by the first filtering unit with the pixel data each delayed by one line from the horizontal pixel data, the second filtering unit including:

a plurality of fourth delayers for delaying the plurality of horizontal pixel data predicted by half pixel pitch by the first filtering unit;

a plurality of second AND gates for performing an AND operation with respect to a vertical half pixel signal based on the motion vector and horizontal pixel data delayed by one line by the respective delaying unit; and a plurality of second adders for producing in parallel a plurality of vertical pixel data predicted by half pixel pitch by adding up each pixel data produced by each line delaying means and each output of the AND gates corresponding to the pixel data.

2. The apparatus according to claim 1, wherein the motion vector is displayed using the half pixel pitch and includes a horizontal motion vector and a vertical motion vector.

3. The apparatus according to claim 2, wherein the shift signal has a value obtained by dividing by 2 a remainder of dividing a horizontal motion vector by 8.

4. The apparatus according to claim 2, wherein the horizontal half pixel signal has a value of a remainder of dividing the horizontal motion vector by 2.

5. The apparatus according to claim 2, wherein the vertical half pixel signal has a value of a remainder of dividing the vertical motion vector by 2.

* * * * *